United States Patent
Warkentin et al.

(10) Patent No.: US 9,489,211 B2
(45) Date of Patent: Nov. 8, 2016

(54) EXPOSING MEMORY-MAPPED IO DEVICES TO DRIVERS THROUGH FIRMWARE

(71) Applicant: VMware, Inc., Palo Alto, CA (US)

(72) Inventors: Andrei Warkentin, Wakefield, MA (US); Alexander Fainkichen, Southborough, MA (US); Harvey Tuch, Cambridge, MA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/675,381

(22) Filed: Mar. 31, 2015

(65) Prior Publication Data

US 2016/0291986 A1    Oct. 6, 2016

(51) Int. Cl.
*G06F 13/00* (2006.01)
*G06F 9/44* (2006.01)

(52) U.S. Cl.
CPC .................... *G06F 9/4411* (2013.01)

(58) Field of Classification Search
CPC ............................ G06F 9/4401; G06F 9/4411
USPC .................... 719/321, 327; 710/10; 713/1, 2
See application file for complete search history.

(56) References Cited

U.S. PATENT DOCUMENTS

| | | | |
|---|---|---|---|
| 7,065,769 B1* | 6/2006 | Tolopka | G06F 9/4415 710/8 |
| 8,463,951 B1* | 6/2013 | Priem | G06F 9/4411 710/10 |
| 8,825,909 B1* | 9/2014 | Delco | G06F 9/4411 710/10 |

* cited by examiner

*Primary Examiner* — Andy Ho

(57) ABSTRACT

A mapping table is passed to system software upon loading of the system software in a computer system. The mapping table is generated from a user-defined configuration file and maps device identifiers of various devices implemented in the computer system, as assigned by the device manufacturers, to device identifiers that are recognizable by the system software. The mapping is used by the system software when it performs binding of device drivers to devices so that devices that have been given generic and sometimes obscure names by the device manufacturers can still be associated with and bound to device drivers loaded by the system software.

20 Claims, 4 Drawing Sheets

EXPOSING MEMORY-MAPPED IO DEVICES TO DRIVERS THROUGH FIRMWARE

BACKGROUND

Certain processor platforms, such as ARM®64 processor platforms, may be configured with system-on-chips (SOCs) which contain various memory-mapped input/output (MMIO) devices that are not on an enumerable bus such as PCIe (Peripheral Component Interconnect Express). This is comparable to devices on the old PC buses of legacy x86 platforms. However, the devices on the legacy x86 platforms were well-known with industry-agreed memory ranges and interrupt lines. On the ARM® 64 processor platforms, by contrast, these "bus-less" devices (termed as such because they are not on an enumerable bus) can be the latest and the most advanced NIC (network interface card) controllers, storage, and so on, and are described by firmware through firmware configuration tables.

For example, in ARM® 64 processor platforms, firmware that is compliant with the ACPI (Advanced Configuration and Power Interface) specification (hereinafter referred to as "ACPI firmware") describes the bus-less devices through DSDT (Differentiated System Description Table), which defines a tree of devices through an interpreted language called AML (ACPI Machine Language). For each bus-less device defined therein, the DSDT contains a descriptor which describes the device's fixed MMIO ranges and interrupt vectors used, as well as its hardware identifier (_HID) and compatible identifier (_CID). These identifiers, hereinafter referred to as device IDs, are used by an operating system (OS) driver to bind to a particular device by matching on a set of IDs supported by the OS driver.

Often, the OS driver is unable to bind to a particular device because the device IDs of bus-less devices have not been standardized and may not be recognizable by the OS driver. For example, a common serial UART (Universal Asynchronous Receiver/Transmitter) known as PL011, may be described using any of the following device IDs, ARMH0011, LNRO000A, LINA000A, or PNP0500 (the format usually conforming to the notation, AAAA####, where AAAA is the assigned vendor, and #### is the assigned device number). In certain situations, the device IDs may be too generic to be recognized. For example, some NICs have device IDs, ETH0000 or SATA0000.

As a result, the OS may not be able to bind a driver to a device if the device ID is too generic, or if a device is known by several device IDs and the one described in the DSDT of the device does not match any of the ones recognized by the OS. In addition, there may be situations where the OS has drivers that can support the device but does not recognize the device ID because the device was developed after the OS was released. In such situations, the OS is unable to bind a driver to the device without an OS patch being installed.

SUMMARY

One or more embodiments provide a mapping table that is passed to the OS, or more generally, system software, as part of configuration tables upon loading of the system software in a computer system. The mapping table is generated from a user-defined configuration file and maps device identifiers of various devices implemented in the computer system, as assigned by the device manufacturers, to device identifiers that are recognizable by the system software. The mapping is used by the system software when it performs binding of device drivers to devices so that devices that have been given generic and sometimes obscure names by the device manufacturers can still be associated with and bound to device drivers loaded by the system software.

A method of binding a driver to a device includes the steps of parsing a device descriptor table that has been loaded into memory from firmware to create a device data structure for a device described therein, mapping a device identifier of the device, also stored in the device descriptor table, to an alternative device identifier, identifying a driver suitable for the device using the alternative device identifier, and binding the driver to the device data structure created for the device.

Further embodiments include a non-transitory computer-readable storage medium storing instructions that, when executed by a computer system, cause the computer system to perform the method set forth above, and a computer system programmed to carry out the method set forth above.

DETAILED DESCRIPTION

Figure 1:
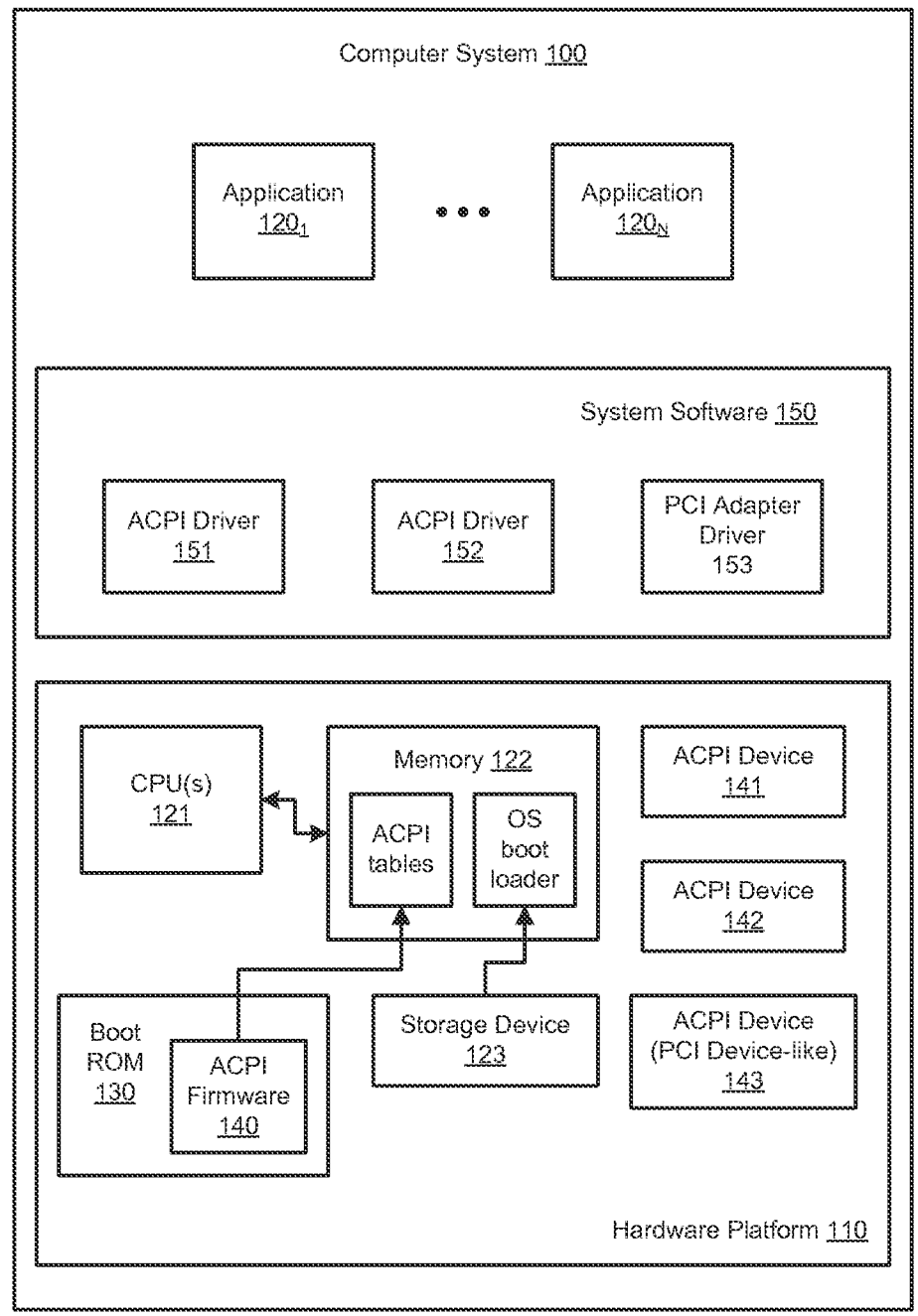
FIG. 1 is a block diagram of a computer system in which embodiments may be implemented.

FIG. 1 is a block diagram of a computer system, shown as computer system 100, in which embodiments may be implemented. Computer system 100 may be constructed on a conventional, typically server-class, hardware platform 110, and includes one or more central processing units (CPUs) 121, system memory 122, a persistent storage device 123, which may be hard disk drive, a solid state drive, or a hybrid drive, a boot ROM (read-only memory) 130 that stores system firmware for computer system 100, which includes ACPI firmware 140, and a plurality of ACPI devices 141, 142, 143. ACPI device 143 differs from ACPI devices 141, 142 in that ACPI device 143 may be configured like a PCI device, as will be described in further detail below, and has a PCI adapter driver associated therewith. ACPI devices 141, 142, 143 may be a NIC controller, a host bus adapter, a graphics adapter, and the like. In the embodiments, ACPI devices may be configured as SOC devices and are MMIO devices that are not on an enumerable bus such as PCIe.

As further shown in FIG. 1, system software 150 is installed on top of hardware platform 110 and supports the execution of applications $120_1$-$120_N$. In one embodiment, system software 150 is a hypervisor and applications 120 are virtual computing instances, e.g., virtual machines having a guest operating system or containers that do not have an operating system. System software 150 includes various drivers for devices of hardware platform 110, including ACPI drivers 151, 152, and PCI adapter driver 153. In another embodiment, system software 150 is an operating system, and applications 120 are applications that have been developed for the operating system.

When computer system 100 is powered on, boot code stored in ROM 130, in particular the system firmware, which includes ACPI firmware 140, takes control. After the system firmware conducts power-on self-tests of all the devices, ACPI firmware 140 is executed to load various ACPI tables into memory 122. Then, boot control is transferred to a boot loader for system software 150 that is loaded into memory from a particular location in storage device 123, e.g., loaded from a master boot record (MBR).

Figure 2:
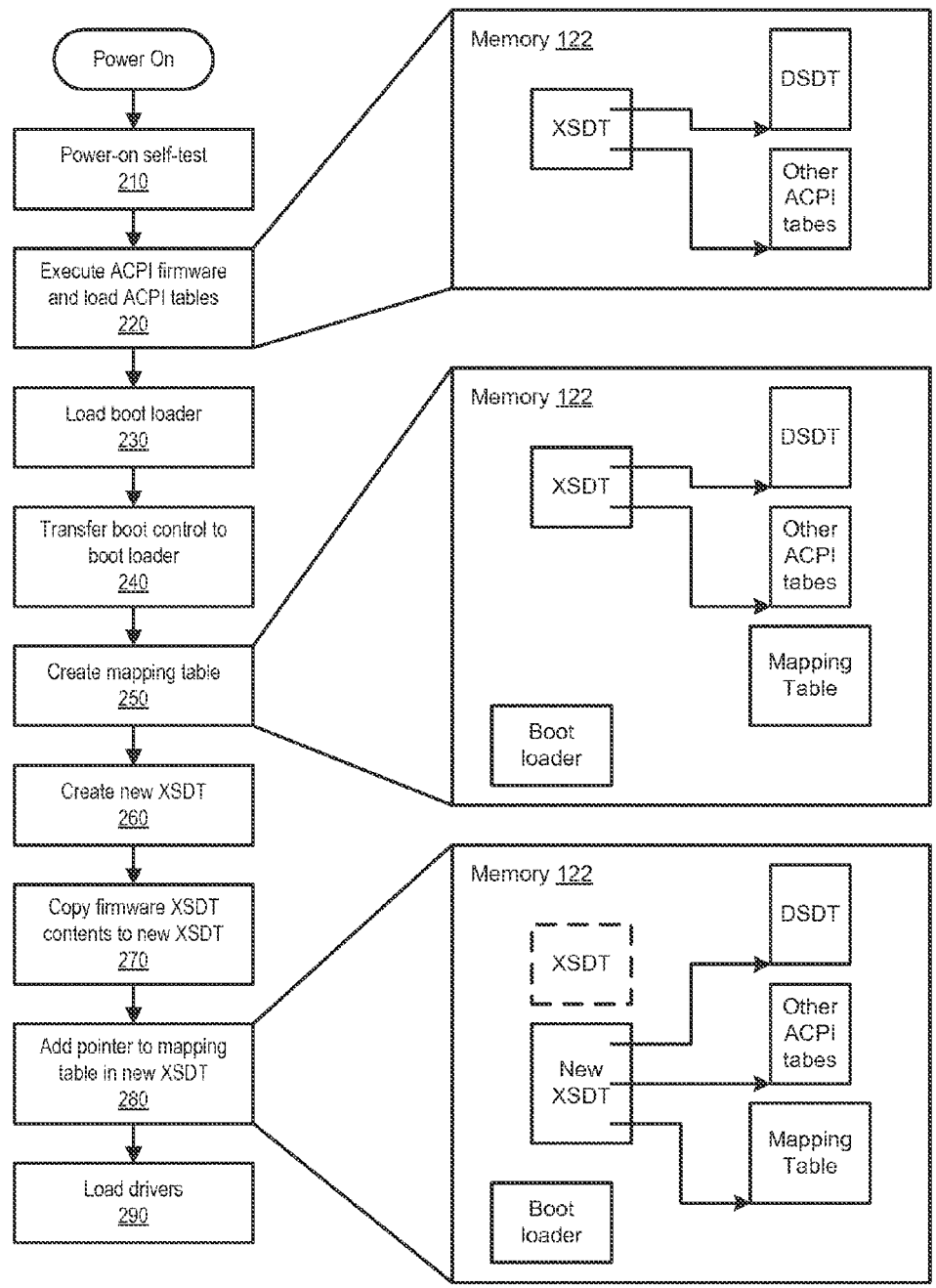
FIG. 2 is a flow diagram of method steps for booting a computer system alongside schematic representations of contents of memory during booting that illustrate one example implementation of the embodiments.

The boot sequence is illustrated in FIG. 2 in further detail. The power-on self-test at step 210 is executed by the system firmware. Then, at step 220, ACPI firmware 140 is executed to load ACPI tables into memory 122 from firmware. The ACPI tables that are loaded include an XSDT that contains pointers to all ACPI tables that have been loaded, including the DSDT. At step 230, the system firmware accesses the MBR to begin loading system software 150. Initially, only a small portion of system software, known as a boot loader, is loaded into memory 122.

At step 240, the system firmware transfers control to the boot loader, and the boot loader executes steps 250, 260, 270, 280, and 290. At step 250, the boot loader reads a user-defined configuration file that contains mappings of various hardware identifiers (e.g., the ones defined by the DSDT for devices implemented in computer system 100) to alternative hardware identifiers, and creates a mapping table that has one or more entries. Each entry maps a hardware identifier of an ACPI device to an alternative hardware identifier or to a PCI device having the following information: PCI-SIG vendor ID, PCI device ID, PCI-SIG subsystem vendor ID, and PCI subsystem ID. Then, the boot loader creates a new XSDT in a region of memory 122 at step 260, and copies contents of original XSDT into the new XSDT at step 270. At step 280, the boot loader adds to the new XSDT a pointer to the mapping table created at step 250. At step 290, the boot loader in conjunction with system software 150 loads all of the drivers supported by system software 150. The binding of the drivers to devices of computer system 100 is described below in conjunction with FIGS. 3 and 4.

Figure 3:
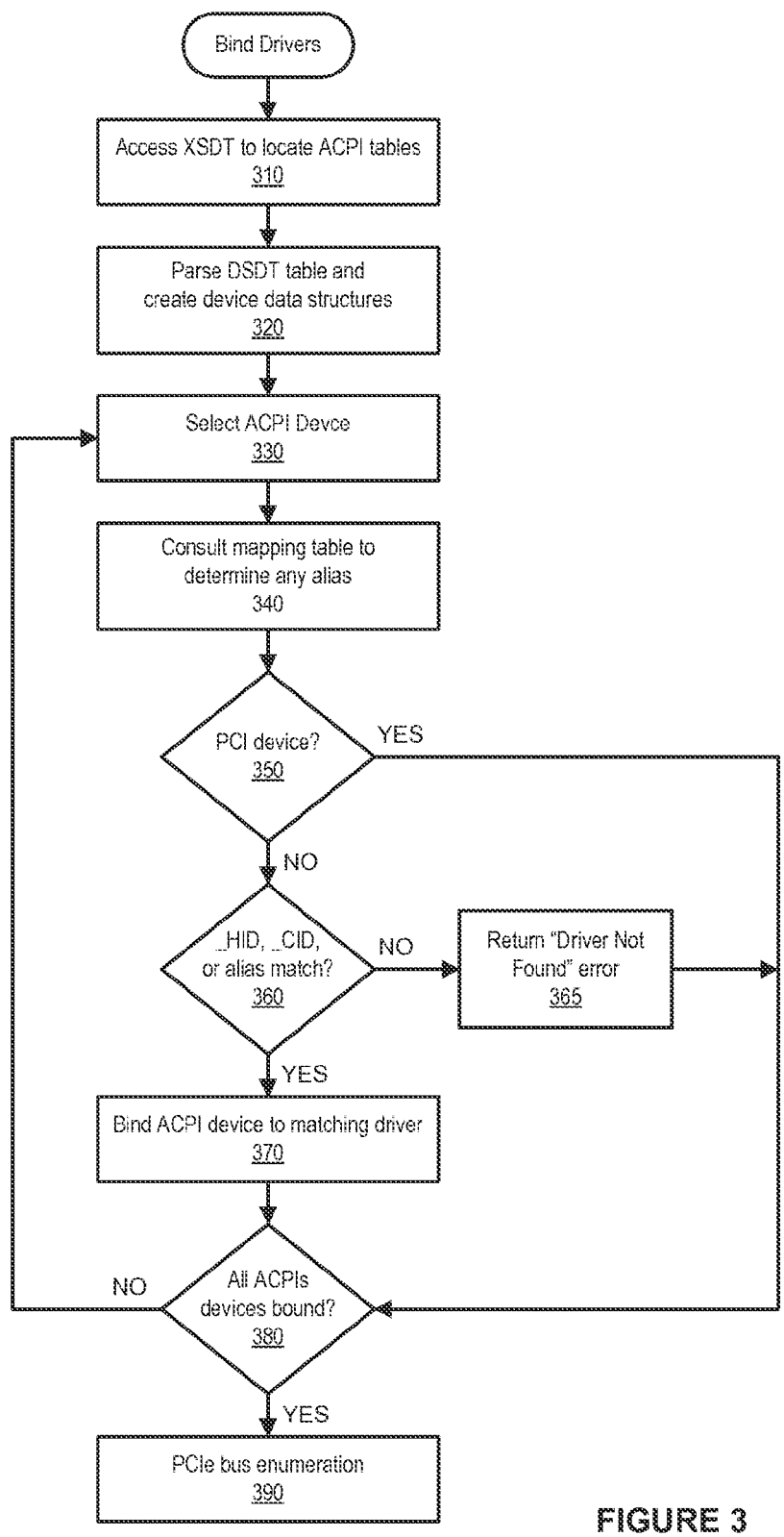
FIG. 3 is a flow diagram of method steps for binding a driver to a device, according to an embodiment.

FIG. 3 is a flow diagram of method steps for binding a driver to a device, according to an embodiment. These method steps are executed by system software 150 after drivers have been loaded into memory 122, and begin at step 310. At step 310, system software 150 accesses XSDT to locate ACPI tables that have been loaded into memory 122. One of the ACPI tables loaded into memory 122 is the DSDT. The DSDT defines a tree of ACPI devices through an interpreted language and when system software 150 parses the DSDT, data structures of all ACPI devices defined in the DSDT are generated at step 320. In addition to the data structures, system software 150, through parsing, extracts the hardware identifier (_HID) and one or more compatible identifiers (_CID) of each ACPI device defined in the DSDT.

System software 150 executes the remaining steps of FIG. 3 to search for the driver that supports each ACPI device defined in the DSDT. A first ACPI device is selected at step 330. Then, at step 340, system software 150 accesses the mapping table to determine if an alias (alternative device name) is defined in the mapping table for the selected ACPI device. If the ACPI device is mapped to a PCI device, the flow skips to step 380 where a check is made to see if there any other ACPI devices remain for binding. The ACPI device that is mapped to a PCI device will be enumerated along with other PCI devices as described below in conjunction with FIG. 4.

On the other hand, if the ACPI device is mapped to an alternative device name, step 360 is executed. At step 360, system software 150 determines if the _HID of the selected device, the _CID of the selected device, or the alias of the selected device is supported by any of the drivers loaded into memory 122. If a matching driver is found, system software 150 binds the matching driver to the selected ACPI device at step 370. Then, at step 380, system software 150 checks to see if there are any other ACPI devices remain for binding. If there are, the flow returns to step 330 where another ACPI device is selected for possible binding.

Returning to step 360, if no matching driver is found, system software 150 returns a "Driver Not Found" error message at step 365, and the flow skips to step 380.

After all ACPI devices have been selected, system software 150 executes step 390 to enumerate the PCIe bus. The details of this step are set forth in FIG. 4.

Figure 4:
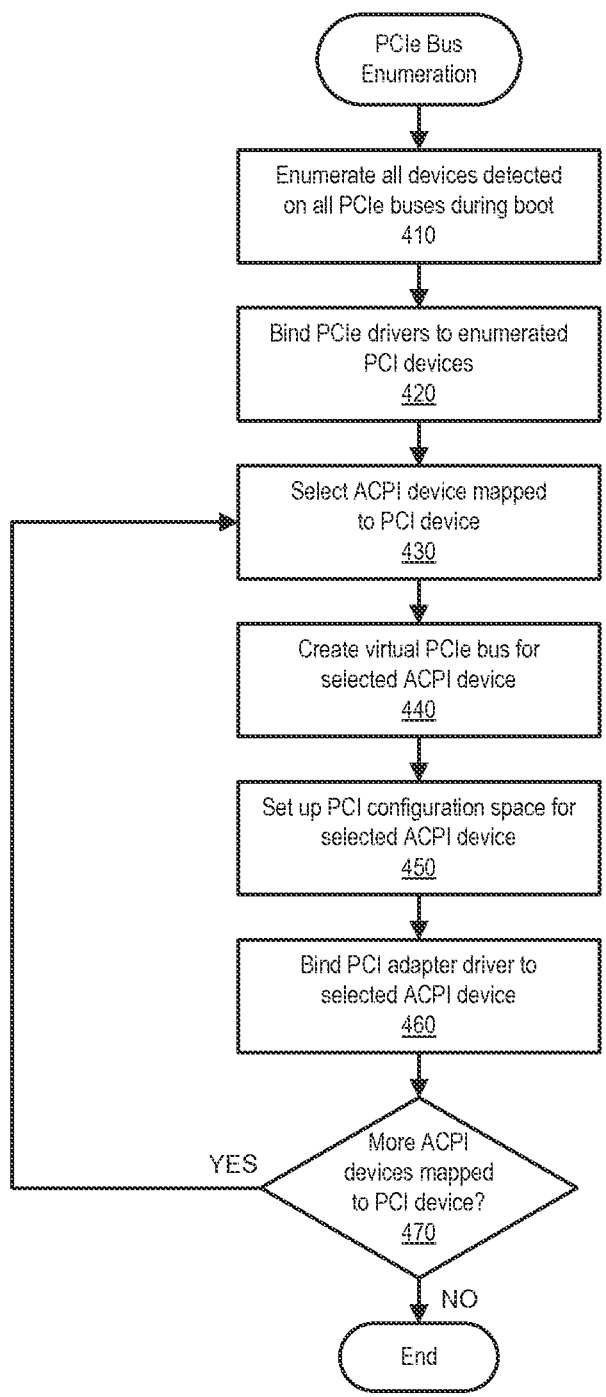
FIG. 4 is a flow diagram of method steps for enumerating a bus, according to an embodiment.

FIG. 4 is a flow diagram of method steps for enumerating a bus, according to an embodiment. These method steps are executed by system software 150 after ACPI drivers have been bound to ACPI devices, and begin at step 410, where system software 150 enumerates all devices detected on all PCIe buses during boot. Then, at step 420, system software 150 binds PCIe drivers to the enumerated devices. It should be recognized that steps 410 and 420 are conventional steps that are well known to persons of skill in the art.

To bind PCI adapter drivers to ACPI devices that are mapped to PCI devices, embodiments provide a virtual PCIe bus or bus segment and determine, by enumeration, the devices that are present on the virtual PCIe bus or bus segment. To provide a virtual PCIe bus or bus segment, system software 150 sets up a persistent PCIe configuration space, which contains the PCI device ID, vendor ID, and other information obtained from the mapping table created in step 250 above, including base registers, and interrupt vectors. The base address registers are mapped one-to-one to the memory/IO ranges of the ACPI device described by the ACPI device descriptor in the DSDT. The interrupt (IRQ) vector is mapped one-to-one to the IRQ vector of the ACPI device found in the DSDT.

Embodiments employ steps 430, 440, 450, 460, and 470 to support binding of PCI adapter drivers to ACPI devices. At step 430, system software 150 selects an ACPI device that is mapped to a PCI device in the mapping table. Then, system software 150 creates a virtual PCIe bus for the selected ACPI device by selecting an unused PCIe bus segment (step 440), and placing the ACPI device on this PCIe bus segment by setting up the PCI configuration space, as explained above, on the PCIe bus segment for the selected ACPI device in accordance with the data structure for the selected ACPI device generated at step 320 and the PCI device information obtained from the mapping table (step 450). After the PCI configuration space is set up at step 450, system software 150 binds the PCI adapter driver to the selected ACPI device. For example, in the example of FIG. 1, PCIe adapter driver 153 is bound to ACPI device 143. At step 470, system software 150 checks to see if there are additional ACPI devices that are mapped to PCI devices in the mapping table. If there are more, the next one is selected in step 430 and steps 440, 450, 460, and 470 are repeated. If there are no more, the process terminates.

In summary, according to embodiment, the mapping table allows ACPI devices to be renamed and used in two ways. For devices which require the use of ACPI-only drivers, the mapping table can provide alternative IDs, e.g., well-known IDs, to the ACPI hardware and compatible IDs stored in the DSDT. For ACPI devices for which there is a PCI adapter driver available, the mapping table and the DSDT can provide enough information for system software 150 to create a virtual PCI device on a virtual PCIe bus, in order for the PCI adapter driver to detect and successfully bind to the ACPI device.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs.

The various embodiments described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims.

In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims.

We claim:

1. A method of binding a driver to a device, comprising:
   parsing a device descriptor table that has been loaded into memory from firmware to create a device data structure for a device described therein;
   mapping a device identifier of the device, also stored in the device descriptor table, to an alternative device identifier;
   identifying a driver suitable for the device using the alternative device identifier; and
   binding the driver to the device data structure created for the device.

2. The method of claim 1, further comprising:
   parsing a user-defined configuration file to generate a mapping table that contains mappings of device identifiers to alternative device identifiers,
   wherein the mapping is carried out using the mapping table.

3. The method of claim 2, further comprising:
   loading a root table into memory from firmware, the root table containing pointers to system configuration tables, including the device descriptor table, that have been loaded into memory from firmware; and
   augmenting contents of the root table to include a pointer to the mapping table.

4. The method of claim 1, wherein the device data structure created for the device defines memory-mapped IO ranges and interrupts for the device.

5. The method of claim 3, wherein the root table and the system configuration tables are ACPI (Advanced Configuration and Power Interface) tables.

6. The method of claim 4, wherein the driver is a PCIe (Peripheral Component Interconnect Express) driver adapted for use with a non-PCIe device.

7. The method of claim 6, further comprising:
   setting up a PCI configuration space using the device data structure created for the device.

8. A non-transitory computer readable medium comprising instructions to be executed in a computer system to cause the computer system to carry out a method of binding a driver to a device, said method comprising:
   parsing a device descriptor table that has been loaded into memory from firmware to create a device data structure for a device described therein;
   mapping a device identifier of the device, also stored in the device descriptor table, to an alternative device identifier;
   identifying a driver suitable for the device using the alternative device identifier; and binding the driver to the device data structure created for the device.

9. The non-transitory computer readable medium of claim 8, wherein the method further comprises:
 parsing a user-defined configuration file to generate a mapping table that contains mappings of device identifiers to alternative device identifiers,
 wherein the mapping is carried out using the mapping table.

10. The non-transitory computer readable medium of claim 9, wherein the method further comprises:
 loading a root table into memory from firmware, the root table containing pointers to system configuration tables, including the device descriptor table, that have been loaded into memory from firmware; and
 augmenting contents of the root table to include a pointer to the mapping table.

11. The non-transitory computer readable medium of claim 8, wherein the device data structure created for the device defines memory-mapped IO ranges and interrupts for the device.

12. The non-transitory computer readable medium of claim 10, wherein the root table and the system configuration tables are ACPI (Advanced Configuration and Power Interface) tables.

13. The non-transitory computer readable medium of claim 11, wherein the driver is a PCIe (Peripheral Component Interconnect Express) driver adapted for use with a non-PCIe device.

14. The non-transitory computer readable medium of claim 13, wherein the method further comprises:
 setting up a PCI configuration space using the device data structure created for the device.

15. A computer system having a plurality of devices, a processing unit, and system memory into which system software has been loaded, wherein the processing unit executes the system software to bind a driver to each of the devices, by carrying out the steps of:
 parsing a device descriptor table that has been loaded into memory from firmware to create a device data structure for a device described therein;
 mapping a device identifier of the device, also stored in the device descriptor table, to an alternative device identifier;
 identifying a driver suitable for the device using the alternative device identifier; and
 binding the driver to the device data structure created for the device.

16. The system of claim 15, wherein the steps carried out by the processing unit further comprises:
 parsing a user-defined configuration file to generate a mapping table that contains mappings of device identifiers to alternative device identifiers,
 wherein the mapping is carried out using the mapping table.

17. The system of claim 16, wherein the steps carried out by the processing unit further comprises:
 loading a root table into memory from firmware, the root table containing pointers to system configuration tables, including the device descriptor table, that have been loaded into memory from firmware; and
 augmenting contents of the root table to include a pointer to the mapping table.

18. The system of claim 15, wherein the device data structure created for the device defines memory-mapped IO ranges and interrupts for the device.

19. The system of claim 17, wherein the root table and the system configuration tables are ACPI (Advanced Configuration and Power Interface) tables.

20. The system of claim 18, wherein the driver is a PCIe (Peripheral Component Interconnect Express) driver adapted for use with a non-PCIe device.

* * * * *